United States Patent [19]

Burgbacher

[11] 4,448,285
[45] May 15, 1984

[54] LUBRICATOR FOR A POWER LOOM

[75] Inventor: Herbert Burgbacher, Hilzingen, Fed. Rep. of Germany

[73] Assignee: Sulzer Brothers Limited, Winterthur, Switzerland

[21] Appl. No.: 323,559

[22] Filed: Nov. 20, 1981

[30] Foreign Application Priority Data

Dec. 2, 1980 [CH] Switzerland ............... 8887/80

[51] Int. Cl.³ .............. D03J 1/00; F16K 31/18; F01M 1/00
[52] U.S. Cl. ................... 184/55 A; 139/1 R; 139/45; 184/6.4; 184/6.26
[58] Field of Search ............ 184/6.26, 55 A, 50 A, 184/55 R, 56 R, 56 A, 57, 58, 103 R, 103 A; 139/1 R, 45; 137/895, 888; 261/78 A, 70, 125; 123/196 M; 239/366, 370, 337, 338, 343, 346; 55/219

[56] References Cited

U.S. PATENT DOCUMENTS 1,871,546  8/1932  McClafferty ............... 55/219
2,778,619  1/1957  Goodyer ............... 184/55 A X
2,887,181  5/1959  Dillon ............... 184/55 A
3,023,849  3/1962  Tine ............... 184/55 A
3,318,323  5/1967  Pearson ............... 55/219 X
3,912,629  10/1975  Sonoda ............... 55/219 X
3,926,280  12/1975  Hoffman ............... 184/55 A
4,117,869  10/1978  Rushman ............... 139/1 R
4,205,708  6/1980  Burgbacher ............... 184/6.26 X Primary Examiner—David H. Brown
Assistant Examiner—John E. Griffiths, Jr.
Attorney, Agent, or Firm—Kenyon & Kenyon

[57] ABSTRACT

The pulse lubricator is constructed to deliver oil sprays to various lubrication points of a power loom and includes a plurality of atomizers. Each atomizer includes an atomizer head and a macro-separator for separating out large droplets of lubricant. A catch basin is disposed below the macro-separator of the atomizer and is in sealed relation to the lubrication reservoir. The catch basin has a check valve in the bottom which is closed during a pulse so that constant pressure is maintained in the spray. Between pulses, the check valve may open to maintain the level of lubricant in the catch basin at the same level as the lubricant in the reservoir.

8 Claims, 5 Drawing Figures

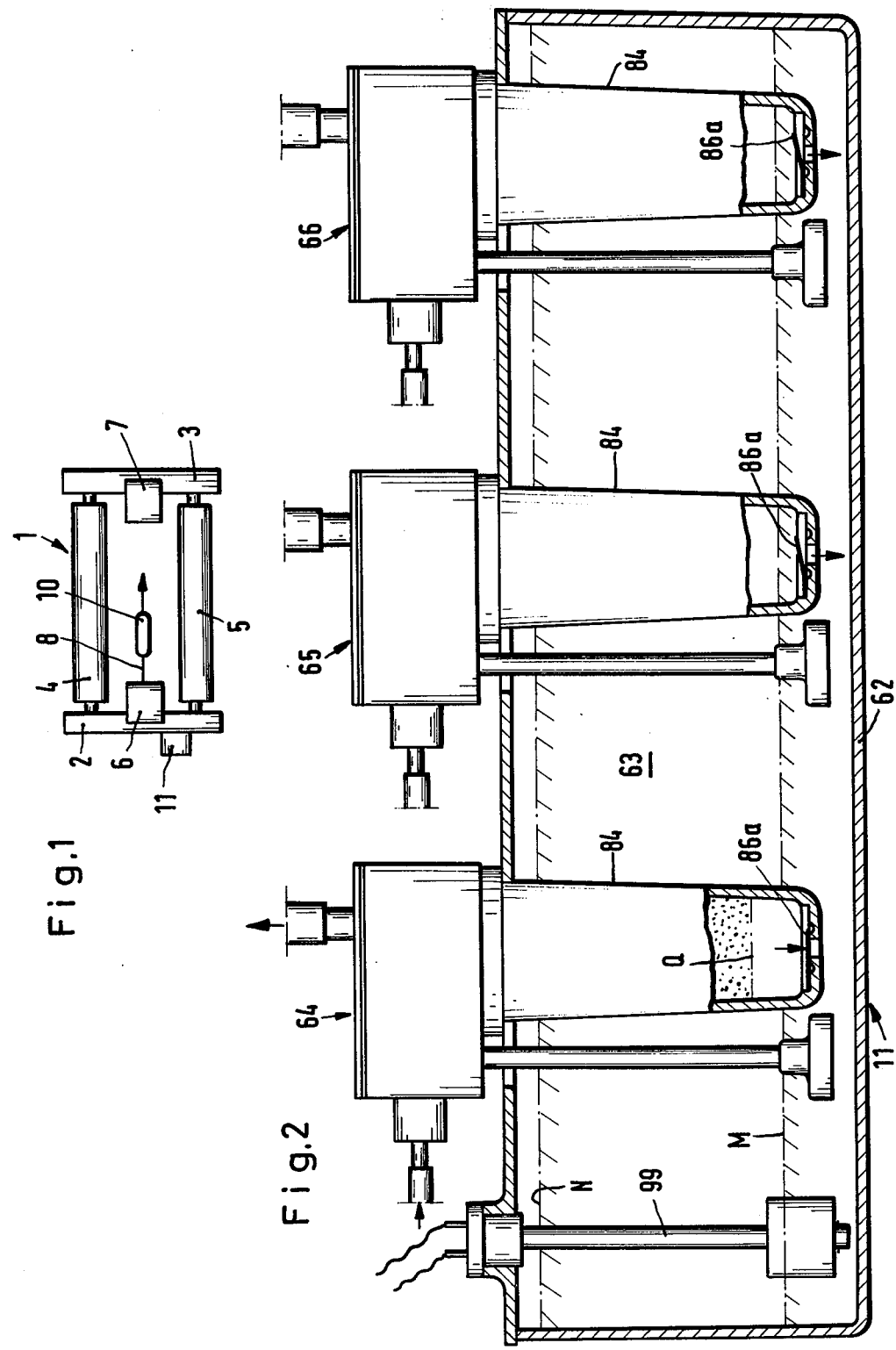

LUBRICATOR FOR A POWER LOOM

This invention relates to a pulse lubricator for a power loom.

As is known, power looms and weaving machines have been provided with various types of lubricating devices in order to insure smooth operation. In some cases, the power loom has been provided with a pulse lubricator from which pulses of lubricant can be supplied from time-to-time to various parts of the loom. For example, one known pulse lubricator is constructed with a lubricant reservoir and at least one atomizer which draws lubricant out of the reservoir in order to create a pulsed spray. In addition, the atomizer has been followed by a macro-separator which is disposed above the reservoir. This macro-separator serves to separate the larger lubricant particles coming from the atomizer while the smaller lubricant particles are conveyed to the lubrication points of the loom as lubricant spray. Generally, the larger lubricant particles which are separated are conveyed into the reservoir; there being no division or separation between the macro-separator and the reservoir.

As a practical matter, the lubricant reservoir of a lubricator should not have too small a volume. This would avoid any need for a weaver to replenish the lubricant too frequently during operation. For example, the reservoir should have a volume of at least one liter or more. However, during operation, as the lubricant level gradually falls, an ever increasing dead volume forms above the lubricant level in the reservoir. This dead volume, in turn, forms an air space into which lubricant spray pulses leaving the atomizer can be directed. Because of this, the pressure in the region between the lubricant outflow opening of the atomizer and the lubrication points decreases more and more as the lubricant level falls in the reservoir. In like manner, the lubrication effect, for example the lubricant spray quantity ejected at the lubrication point as well as the intensity of the spray, decreases. Hence, during operation, the lubrication effect becomes undesirably less and less.

Accordingly, it is an object of the invention to provide a pulse lubricator of improved construction.

It is another object of the invention to provide a pulse lubricator for a power loom which can be readily operated over an extended period of time.

It is another object of the invention to provide a pulse lubricator which operates with constant pressure of spray pulses independently of the level of lubricant in an associated lubricant reservoir.

Briefly, the invention provides a pulse lubricator which comprises an atomizer and a lubricant catch basin. The atomizer has a head which includes means for forming a lubricant spray and a macro-separator for receiving the lubricant spray in order to separate large lubricant particles from the spray. The catch basin is sealingly connected to the atomizer head below the macro-separator in order to receive the separated large lubricant particles.

The pulse lubricator is constructed so that the catch basin can be disposed within a lubricant reservoir such that the catch basin has a volume substantially smaller than the volume of the lubricant reservoir.

In addition, the catch basin is provided with a check valve at a lower end for releasing lubricant into the reservoir from time to time. In this regard, the check valve selectively communicates the catch basin with the reservoir so that in response to an instantaneous positive pressure of a lubricant spray from the atomizer into the macro-separator, the check valve closes.

In one embodiment, a float can be provided for opening the check valve when a spray is not being ejected from the atomizer.

By positioning the catch basin below the macro-separator in pressure proof relation to the reservoir, a relatively small dead volume exists above the lubricant level in the catch basin. This dead volume is also relatively small as compared with the volume of the lubricant lines or spaces between the outflow opening of the atomizer and the lubrication points to which the sprays are directed. As a result, should fluctuations of the dead volume occur, the pressure variations (secondary pressure) caused by the pulse lubrication are likewise relatively small. Hence, a practically constant lubrication effect can be achieved at the lubrication points.

As a matter of comparison, in the previously known pulse lubricators, at equal pulse duration, the secondary pressure decreases relatively sharply at the lubrication points as the level in the lubricant reservoir descends. This is caused by the relatively large dead volume above the lubricant level in the reservoir which forms as the lubricant level falls during operation. As a result of this large dead volume, the secondary pressure at the lubrication points also decreases. As a consequence, the lubrication effect and the efficiency of the lubrication diminish. This results from the fact that, at decreasing secondary pressure, a relatively large proportion of lubricant droplets of the lubricant spray can escape into the environment instead of reaching the various lubrication points in a controlled manner.

These and other objects and advantages of the invention will become more apparent from the following detailed description taken in conjunction with the accompanying drawings wherein:

FIG. 1 illustrates a schematic top view of a power loom having a lubricator constructed in accordance with the invention;

FIG. 2 illustrates a sectional view through various parts of a lubricator constructed in accordance with the invention;

Figure 3:
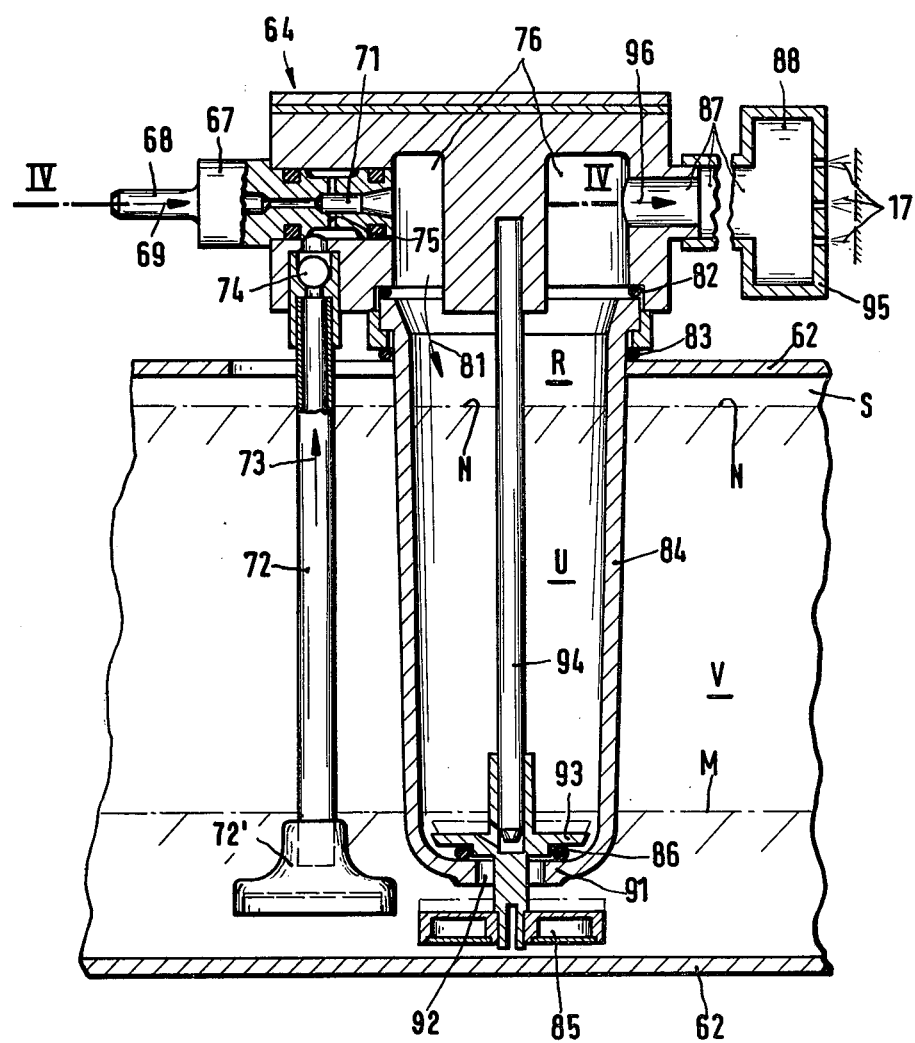
FIG. 3 illustrates a cross-sectional view of a lubricator according to the invention.

Referring to FIG. 1, the power loom 1 is constructed in a conventional manner. To this end, the loom 1 includes a pair of side members 2, 3 in which a warp beam 4 and a cloth beam 5 are mounted. In addition, a picking mechanism 6 is mounted on one side member 2 while a catching mechanism 7 is mounted in the other side member 3 for a projectile 10 which inserts a weft thread 8 into a shed (not shown) formed within the loom. As indicated, a pulse lubricator 11 is mounted on the side member 2 for various lubrication points of the loom 1.

Referring to FIG. 2, the lubricator 11 includes a reservoir 62 for a lubricant such as oil 63 as well as a multiplicity (e.g. three) of atomizers 64, 65, 66 for drawing lubricant from the reservoir 62. Each atomizer 64, 65, 66 is of the same construction and, hence, only one will be described in the following.

Figure 4:
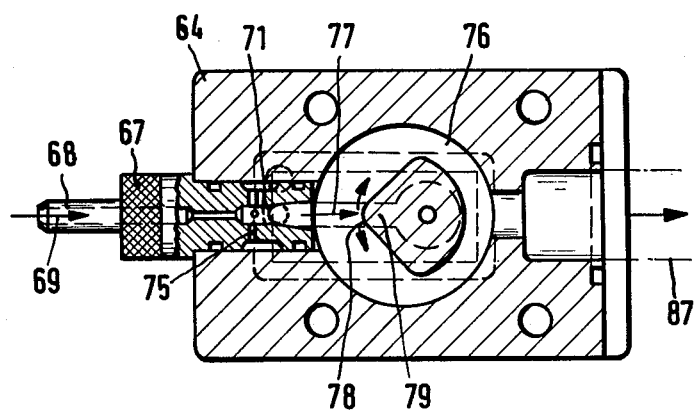
FIG. 4 illustrates a view taken on line IV—IV of FIG. 3.

Referring to FIGS. 3 and 4, the atomizer 64 includes a head having means therein for forming a lubricant spray and a macro-separator for receiving the lubricant spray in order to separate large lubricant particles from the spray. As illustrated, the means for forming a lubricant spray includes an oil atomizer nozzle 67 to which air pulses (primary pressure) are supplied from a suitable control device via a duct 68 in the direction indicated by the arrow 69. The duct 68 communicates with a duct 71 which is of enlarged cross-section. In addition, a suction line or tube 72 extends from the head downwardly into the reservoir 62 and carries a suction head 72' at the lower end. The suction tube 72 communicates via a check valve 74 with a duct 75 in the nozzle 67. The duct 75, in turn, communicates with the enlarged duct 71 such that, due to the venturi effect achieved by the ducts 68, 71, oil is drawn upward in the direction indicated by the arrow 73 from the reservoir 62 through the suction tube 72, check valve 74 and duct 75 into the duct 71. Thus, during pulsing, the oil in the duct 71 is mixed with the supplied air so that an oil spray is ejected into a chamber 76 of the head in the direction indicated by the arrow 77 (see FIG. 4) under a secondary pressure.

As indicated in FIG. 4, the macro-separator is formed by a depending core 79 of kidney-shaped cross-section which has an impingement area 78 facing the duct 71. Upon impingement of a spray onto the area 78 of the core 79, the oil particles of larger shape and greater weight are separated and fall in the direction indicated by the arrow 81 in FIG. 3.

As shown in FIG. 3, a lubricant catch basin 84 protrudes from the atomizer 64 into the reservoir 62 in pressure-proof relation. This catch basin 84 is flanged and is sealingly secured to the atomizer head below the macro-separator via seals 82, 83. As indicated, the volume U, for example 50 cubic centimeters, of the catch basin 84 is substantially smaller than the volume V, for example 1,000 cubic centimeters of the reservoir 62. Consequently, the dead volume R above the oil level N, for example 10 cubic centimeters, in the catch basin 84 is substantially smaller as compared with the dead volume S, for example 200 cubic centimeters, above the oil level in the reservoir 62.

As also shown in FIG. 3, the catch basin 84 includes a check valve 86 in the lower end in order to selectively communicate the catch basin 84 with the reservoir 62. This check valve 86 is controlled by a float 85 within the reservoir so that when the valve 86 is in an open position, the volume U of the catch basin 84 is in communication with the volume V of the reservoir 62. As shown, the lower end 91 of the catch basin 84 is provided with an aperture 92 while the check valve 86 includes a disk 93 which is slidably mounted on a rod 94 which is fixed in depending manner from the core 79. During operation, the valve 86 is able to slide on the rod 94, for example upwardly into the dotted line position illustrated in FIG. 3. Of note, this dotted line position indicates a normally open position of the check valve 86 assuming that the level of oil M within the reservoir 62 is above the level of the float 85.

Alternatively, a flutter valve 86a as shown in FIG. 2 may be used in place of the check valve 86.

Referring to FIG. 3, the atomizer 64 also includes a duct 87 which extends from the chamber 76 to a distribution chamber 88 in order to convey a generated oil spray pulse to the distribution chamber 88. In turn, the distribution chamber 88 ejects a multiplicity of sprays to several lubrication points 17 of the loom 1.

During operation, air pulses are conveyed under a primary pressure into the atomizer 64 in the direction indicated by the arrow 69 (see FIG. 3). Each time an air pulse occurs, a secondary pressure briefly occurs in the chamber 76 and in the dead volume R within the catch basin 84. As a result, the check valve 86 is moved into the closing position illustrated in FIG. 3. Consequently, a constant and sufficiently high pressure is maintained in the chamber 76 and distribution chamber 88. Thus, during oil spray pulses, an adequate quantity of oil spray can be directed to the lubrication points 17.

After termination of an introduced air pulse and of the respective oil spray pulse, the pressure in the chamber 76 and the dead volume R again decreases. Thus, the check valve 86 is opened under the action of the float 85. In this way, the oil level N in the interior of the catch basin 84 and the oil level M in the reservoir 62 can be equalized, i.e. brought to the same height.

During an oil spray pulse, a certain quantity of oil is separated as indicated by the arrow 81 and conveyed to the catch basin 84. Hence, with the check valve 86 closed, the level N in the catch basin 84 can temporarily rise somewhat to the level Q (FIG. 2). This rise is then equalized in the following open phase of the valve 86, i.e. the excess oil can transfer into the reservoir 62 though the aperture 92.

Referring to FIG. 3, when after a certain period of operation the oil level descends from a maximum level N and falls to a minimum level M, the level in the catch basin 84 will fall because of the ever recurring equalization through the aperture 87. While the dead space R is thus increased, the dead space R remains small relative to the chamber 76 and distribution chamber 88 as well as the duct 87. Thus, during the oil spray pulses, sufficient pressure exists in these chambers and in the line system to the lubrication points 17. The lubrication effect at the lubrication point 17 is therefore practically independent of the instantaneous oil level in the reservoir 62 which may fluctuate between the level N and M.

As shown in FIG. 2, the oil level within the reservoir 62 may be monitored by a level monitor 99 in known fashion.

As can be seen in FIG. 3, the lower end 91 of the catch basin extends so far down in the reservoir 62 that the check valve 86 and aperture 92 lie below the minimum permissable lower oil level M. As indicated also, the suction tube 72 is located outside of the catch basin 84 in the reservoir 62 with the suction head 92 arranged to lie below the level M.

Figure 5:
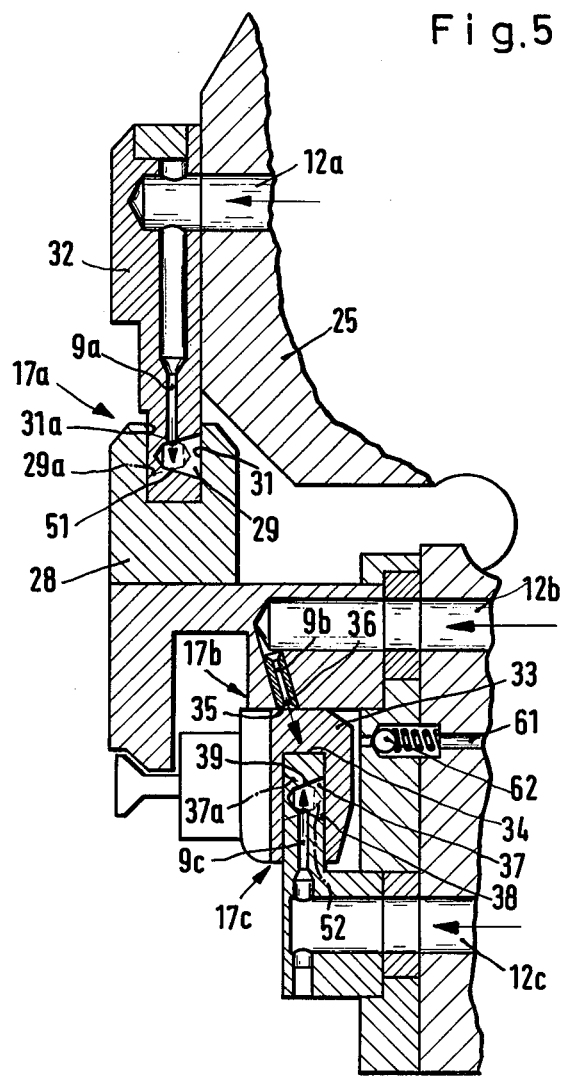
FIG. 5 illustrates a cross-sectional view of various lubricating points within a power loom.

Referring to FIG. 5, the loom may have three lubrication points 17a, 17b, 17c in a picker housing 25. Each lubrication point 17a, 17b, 17c contains a feed line 12a, 12b, 12c and a nozzle 9a, 9b, 9c.

At the lubrication point 17a, an oil spray and air pulses are introduced through one or more spray chambers 29, 29a during reciprocation of a drive slider 28 of a yarn feeder and pull-back (not shown) perpendicular to the plane of the drawing. As indicated, the oil spray arrives, in part, on an opposite impingement area 51 between the spray chambers 29, 29a and oil particles reach the areas 31, 31a to be lubricated between the slider 28 and a fixed guide rail 32.

At the lubrication point 17b, oil spray and air pulses alternately reach a lubrication point 35 or 34 depending on whether a picker 33 covers or clears a nozzle opening 36. As indicated, the projectile picker 33 reciprocates in a direction perpendicular to the plane of the drawing.

At the lubrication point 17c for the picker 33, the oil spray pulse coming through the nozzle 9c as well as the scavaging air pulse, pass through a spray chamber 37 disposed in the plane of the drawing. This spray chamber 37 has an impingement area 39 on which the spray may impinge to lubricate a lubrication area 38. In addition, a spray chamber 37a is disposed behind the spray chamber 37, as viewed, and communicates with an opposite lubrication area.

As indicated in FIG. 5, a duct 61 with a ball valve 62 may be provided for drawing off oil spray (lost oil spray) by suction pulses in a suitable programmed sequence.

It is desirable to use only oil particles of low weight or low volume in the oil spray intended for the lubrication points 17 so that particles of larger oil volume are separated in the macro-separator 78, 79. In this manner, a so-called lean lubrication can be obtained. This, in turn, avoids soiling of the fabric or threads by excessively lubricated machine parts and, particularly, by the projectile 10.

Of note, by having the oil spray pulses issue from the lubrication points 17 fuzz can be cleaned from the lubrication points.

The invention thus provides a pulse lubricator which can operate with practically constant oil spray pulses at constant pressure and with constant oil quantities dispensed at the lubrication points.

I claim:

1. A pulse lubricator comprising
   an atomizer head,
   a nozzle in said head for forming a lubricant spray;
   a macro-separator in said head for receiving a lubricant spray from said nozzle to separate large lubricant particles from the spray;
   a lubricant catch basin sealingly connected to said atomizer head below said macro-separator to receive the separated large particles, and having a check valve at a lower end for releasing lubricant therefrom; and
   a suction line extending from said head entirely outside said basin for drawing lubricant from a reservoir into said nozzle.

2. A pulse lubricator for a power loom comprising
   a lubricant reservoir;
   at least one atomizer for drawing lubricant from said reservoir, said atomizer including means for forming a lubricant spray and a macro-separator disposed above said reservoir and downstream of said means to receive a lubricant spray therefrom and to separate out large lubricant particles from the received spray; and
   a lubricant catch basin protruding into said reservoir from below said macro-separator to receive the separated large lubricant particles, said catch basin having a volume substantially smaller than the volume of said reservoir.

3. A pulse lubricator as set forth in claim 2 wherein said atomizer has a suction line extending into said reservoir outside said catch basin.

4. A pulse lubricator as set forth in claim 2 which further comprises a check valve in a lower end of said catch basin to selectively communicate said catch basin with said reservoir whereby in response to an instantaneous positive pressure of a lubricant spray from said means into said macro-separator said check valve closes.

5. A pulse lubricator as set forth in claim 4 which further comprises a float for opening said check valve.

6. A pulse lubricator for a power loom comprising
   a lubricant reservoir of predetermined volume;
   at least one atomizer for drawing lubricant from said reservoir, said atomizer including means for forming a lubricant spray and a macro-separator disposed above said reservoir and downstream of said means to receive a lubricant spray therefrom and to separate large lubricant particles from the received spray;
   a lubricant catch basin protruding into said reservoir from below said macro-separator to receive the separated large lubricant particles, said catch basin having a volume substantially smaller than said volume of said reservoir; and
   a check valve in a lower end of said catch basin, said check valve being in a normally open position to communicate said catch basin with said reservoir and being closed in response to a lubricant spray entering said macro-separator from said means.

7. A pulse lubricator as set forth in claim 6 which further comprises a float in said catch basin for biasing said check valve from a closed position to said normally open position.

8. A pulse lubricator as set forth in claim 7 wherein said atomizer has a suction line extending from said means into said reservoir outside said catch basin for drawing lubricant to said means.

* * * * *